(12) United States Patent
Ireland et al.

(10) Patent No.: US 10,764,147 B1
(45) Date of Patent: Sep. 1, 2020

(54) INTERMEDIATE SWITCH IDENTIFICATION

(71) Applicant: Hewlett Packard Enterprise Development LP, Houston, TX (US)

(72) Inventors: Timothy Ireland, Westford, MA (US); Simon McCormack, Nashua, NH (US); David C. Fogaren, Jr., Medway, MA (US); Richard Ings, Hudson, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/513,287

(22) Filed: Jul. 16, 2019

(51) Int. Cl.
*H04L 12/24* (2006.01)
*H04L 12/931* (2013.01)
*H04L 12/933* (2013.01)
*H04L 12/721* (2013.01)

(52) U.S. Cl.
CPC ............ *H04L 41/12* (2013.01); *H04L 45/06* (2013.01); *H04L 49/104* (2013.01); *H04L 49/351* (2013.01)

(58) Field of Classification Search
CPC . H04L 41/00–41/5096; H04L 49/00–49/9094; H04L 45/00–45/304
See application file for complete search history.

(56) References Cited

U.S. PATENT DOCUMENTS

| 8,208,386 | B2 | 6/2012 | Fowler et al. | |
|---|---|---|---|---|
| 9,172,609 | B1 | 10/2015 | Reddy et al. | |
| 9,294,376 | B2 | 3/2016 | Morita | |
| 9,559,898 | B2 | 1/2017 | Gong et al. | |
| 9,942,623 | B2 | 4/2018 | Srinivas et al. | |
| 2017/0279680 | A1* | 9/2017 | K Sebastian | H04L 61/2007 |
| 2017/0310588 | A1* | 10/2017 | Zuo | H04L 45/74 |
| 2018/0241632 | A1* | 8/2018 | Shetty | H04L 41/22 |

OTHER PUBLICATIONS

Simon Mccormack, "HPE Synergy with HPE Composable Fabric, HPE Discover—Meet the Experts," Jun. 2019, pp. 1-6, Hewlett Packard Enterprise.
VMware, Inc., "vSphere Networking," Feb. 12, 2018, pp. 1-260, Update 1, Palo Alto, CA, USA.

* cited by examiner

*Primary Examiner* — Clayton R Williams
(74) *Attorney, Agent, or Firm* — Jaffery Watson Mendonsa & Hamilton (57) ABSTRACT

A system to facilitate identification of intermediate switches within a network switching fabric is described. The system includes a processor and a machine readable medium storing instructions that, when executed, cause the processor to discover a host neighbor advertisement message received at a network virtualization infrastructure from an intermediary switch, receive a neighbor advertisement message from the intermediary switch via a top of rack (TOR) switch and identify a location of the intermediary switch within the network switching fabric based on the host neighbor advertisement message and the neighbor advertisement message.

20 Claims, 6 Drawing Sheets

INTERMEDIATE SWITCH IDENTIFICATION

BACKGROUND

Data centers provide a pool of resources (e.g., computational, storage, network) that are interconnected via a communication network. In modern data center network architectures a network switching fabric typically serves as the core component that provides connectivity between the network resources, and facilitates the optimization of server to server (e.g., east-west) traffic in the data center. Such switching fabrics may be implemented using a software-defined transport fabric that interconnects a network of resources and hosts via a plurality of top of rack network (TOR) fabric switches.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

In some applications, intermediate layer 2 switches (or intermediate switches) may be added to a network switching fabric, such as a network switching fabric in a data center as described above, to provide a higher port density (e.g., to connect more hosts to the fabric). In such applications, an intermediate switch may be coupled between one or more hosts and one or more TOR switches. When added to the network, the intermediate switch implements a network discovery protocol (e.g., Link Layer Discovery Protocol (LLDP) or Cisco Discovery Protocol (CDP)) to advertise the switch's presence to the TOR fabric switches. The data exchanged during a network discovery protocol is used to provide current information (e.g., neighbor information) that identifies devices that are actively connected to a particular network switch port, and vice-versa. However whenever an intermediate switch receives a protocol message from a host, the switch does not forward the protocol message to the TOR switch. Thus, there may not be sufficient information to identify the location of the intermediate switch within the fabric architecture.

In embodiments, a mechanism is provided to facilitate identification of intermediate switches within a network switching fabric. In such embodiments, an intermediate switch is identified using network discovery protocol data received from one or more access ports of a top of rack (TOR) network fabric switch coupled to the intermediate switch and from one or more hosts, coupled to the intermediate switch, that reside in a virtualization infrastructure. In further embodiments, a visualization model of a topology of the network switching fabric including the identified intermediate switch may be generated.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
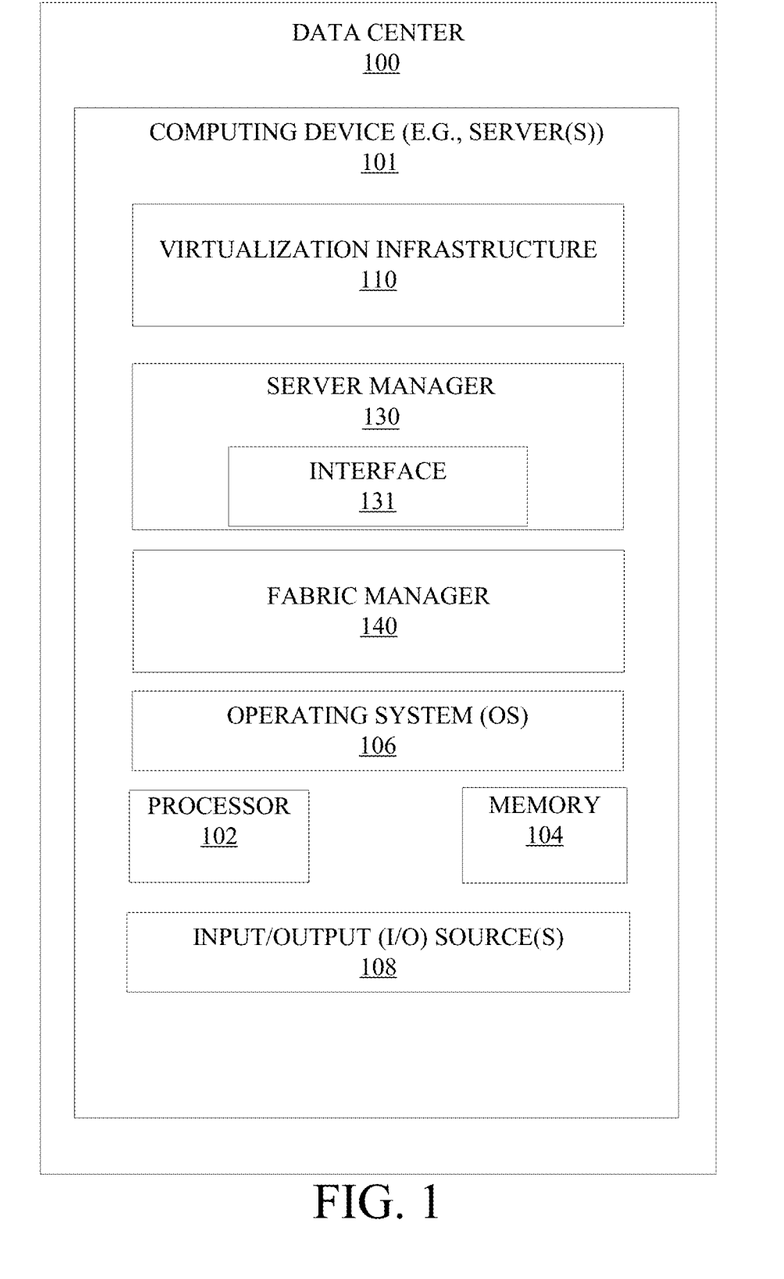
FIG. 1 illustrates one embodiment of a system employing a data center.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization for a plurality of host resources (or virtualization hosts) included within data center 100. In one embodiment, virtualization infrastructure 110 is implemented via a virtualized data center platform (including, e.g., a hypervisor), such as VMware vSphere. However other embodiments may implement different types of virtualized data center platforms. Computing device 101 also facilitates operation of a network switching fabric. In one embodiment, the network switching fabric is a software-defined transport fabric that provides connectivity between the hosts within virtualization infrastructure 110.

Figure 2A:
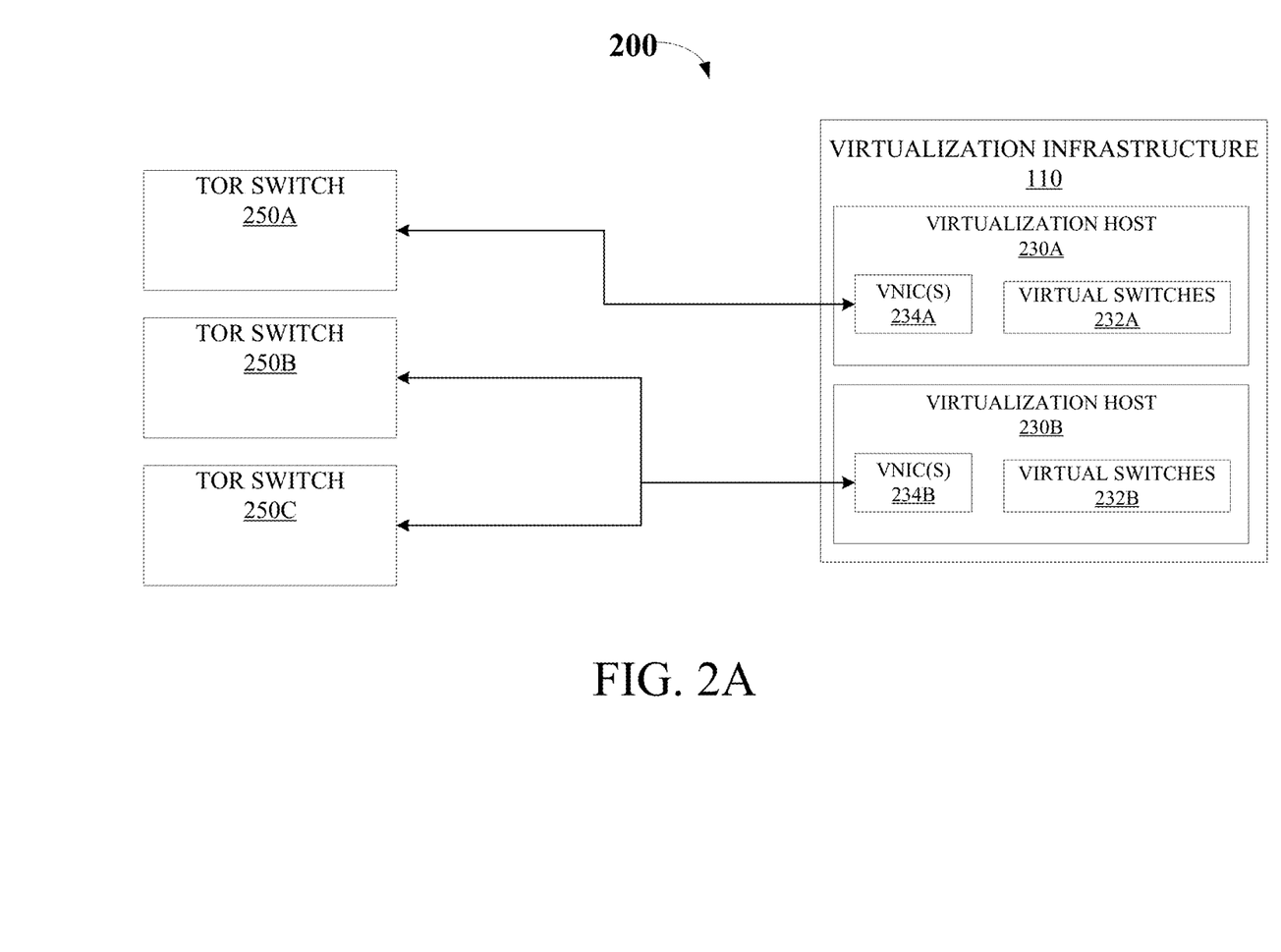
FIGS. 2A & 2B illustrate embodiments of a network switching fabric.

FIG. 2A is a block diagram illustrating one embodiment of a network switching fabric (or fabric) 200. As shown in FIG. 2A, fabric 200 includes a plurality of TOR switches 250 (e.g., 250A-250C) coupled to virtualized hosts 230 within virtualization infrastructure 110. In one embodiment, a TOR switch 250 is coupled to one or more virtual switches 232 within a host 230 via one or more virtual network interface cards (VNICs) 234. For instance, TOR switch 250A may be coupled to virtual switches 232A via VNICs 234A within host 230A, while TOR switches 250B and 250C may be coupled to virtual switches 232B via VNICs 234B within host 230B.

Referring back to FIG. 1, a server manager 130 is also included in computing device 101. Server manager 130 is configured to communicate with and manage virtualization hosts 230. In one embodiment, server manager is implemented via a vCenter management utility. Server manager 130 includes an interface 131 to communicate with a fabric manager 140 implemented to manage fabric 200.

Figure 3:
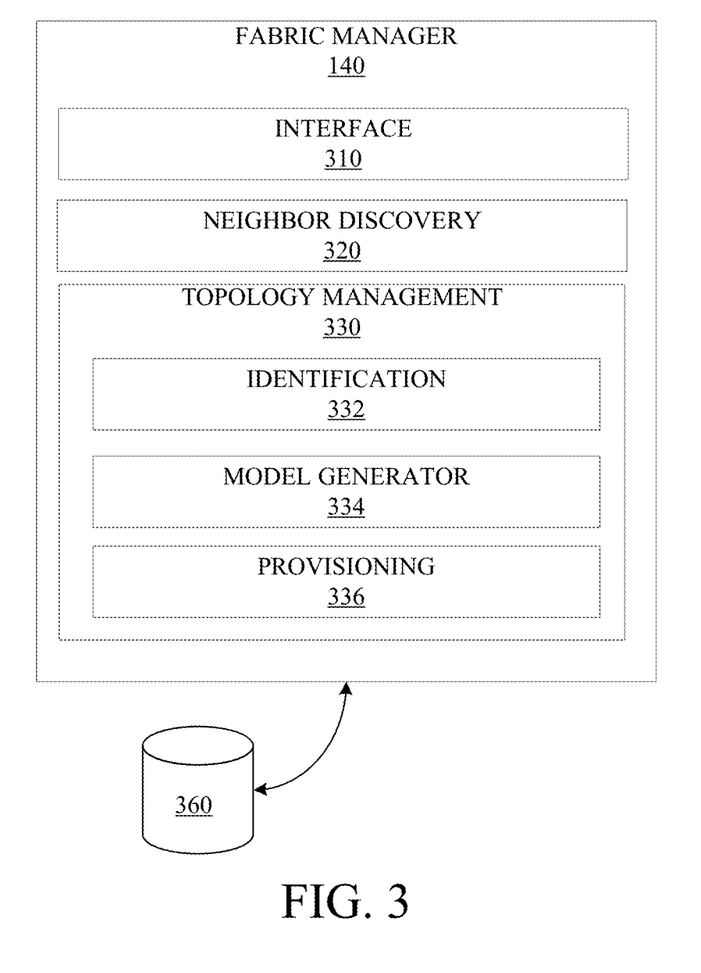
FIG. 3 is a block diagram illustrating one embodiment of a fabric manager.

FIG. 3 is a block diagram illustrating one embodiment of fabric manager 140. As shown in FIG. 3, fabric manager 140 includes an interface 310 that is configured to gather data from server manager 130 regarding the virtualization hosts 230 operating within virtualization infrastructure 110. In one embodiment, interface 310 is implemented as a Representational State Transfer (REST) application program interface (API) for fabric manager 140. In such an embodiment, interface 310 may retrieve an object model of server manager 130 to determine locations within fabric 200 at which the virtualization hosts 230 are connected to TOR switches 250.

Figure 2B:
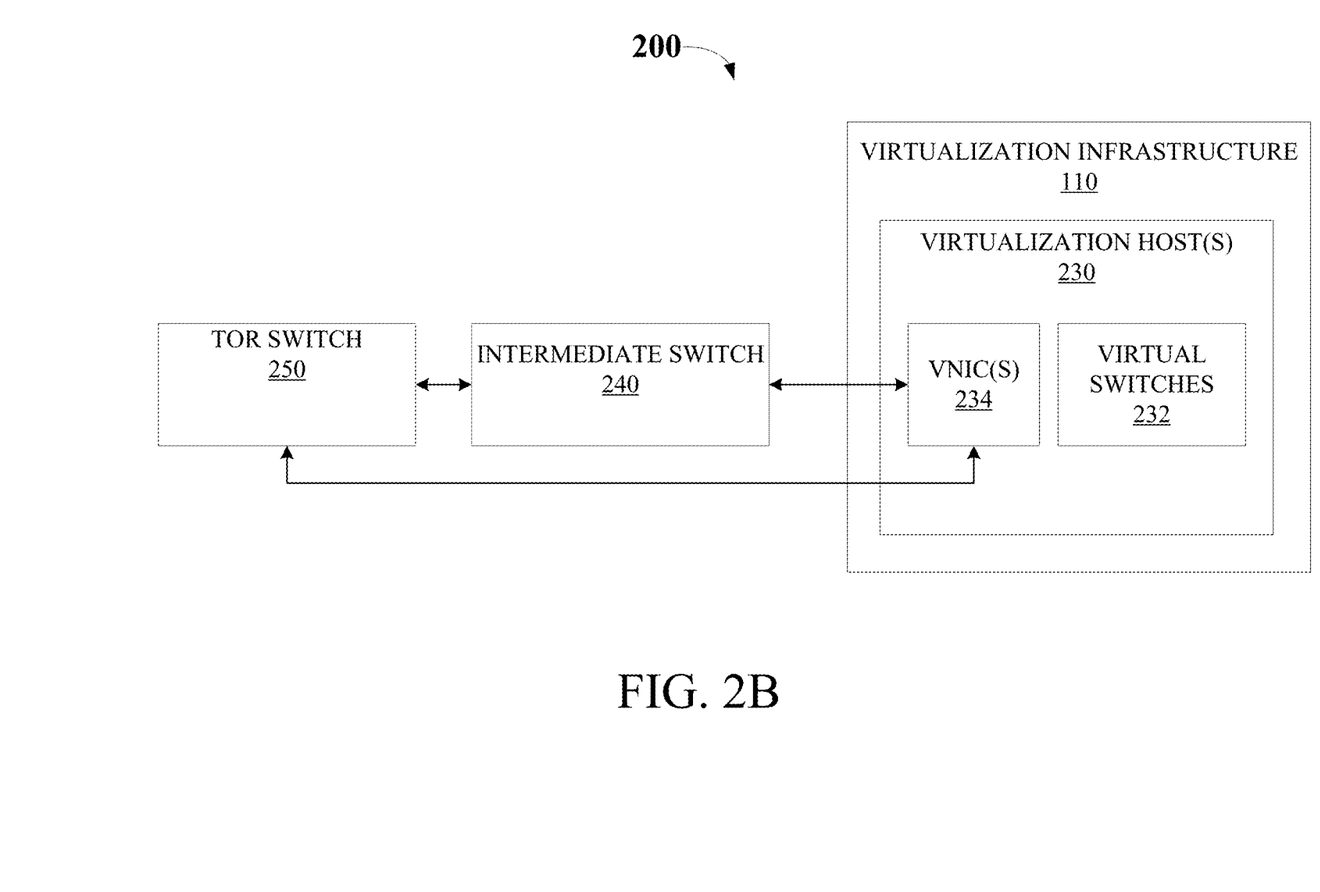

Fabric manager 140 also includes a neighbor discovery module 320 to discover devices within fabric 200. As discussed above, intermediate switches may be added to fabric 200 (e.g., coupled between one or more virtualization hosts 230 and one or more TOR switches 250) to provide a higher port density. FIG. 2B is a block diagram illustrating one embodiment of network switching fabric 200 including an intermediate switch 240.

According to one embodiment, neighbor discovery module 320 discovers (or detects) the presence of intermediate switch 240 upon insertion of switch 240 into fabric 200. In such an embodiment, neighbor discovery module 320 detects switch 240 upon receiving a network discovery protocol (e.g., LLDP or CDP) advertisement message (or neighbor advertisement message) transmitted from intermediate switch 240 via TOR switch 250. However, fabric manager 140 may be unable to accurately identify the intermediate switch 240 since neighbor discovery module 320 receives no neighbor information regarding the switch 240 from a virtualization host 230.

According to one embodiment, intermediate switch 240 is configured to advertise in both directions (e.g., from access ports and uplink ports), resulting in advertisement messages being transmitted from intermediate switch 240 to one or more virtualization hosts 230 (e.g., via access ports) as well as to the TOR switches 250 (e.g., via uplink ports). In one embodiment, the advertisement configuration is manually performed at an intermediate switch 240 by an operator. However in other embodiments, an intermediate switch 240 may be automatically configured upon powering up.

In a further embodiment, a neighbor discovery protocol receive mode is enabled on virtual switches 232, as well as TOR switches 250. In such an embodiment, fabric manager 140 automatically enables the neighbor discovery protocol whenever an instance of a virtualization integration, or whenever a virtual switch 232, is created. In yet a further embodiment, neighbor discovery module 320 tracks all advertisement messages received by virtualization hosts 230 from an intermediate switch 240, in addition to tracking the advertisement messages received from TOR switches 250.

According to one embodiment, neighbor discovery module 320 polls interface 131 of server manager 130 for advertisements received from virtualization hosts 230. Accordingly, neighbor discovery module 320 discovers advertisement messages (or host neighbor advertisement messages) that have been received at virtualization hosts 230 from an intermediate switch 240 (e.g., server facing access ports of the TOR fabric switches 250). Upon receiving an advertisement message (either neighbor advertisement message (or non-host neighbor advertisement message) or host neighbor advertisement message), neighbor discovery module 320 stores the message in a database 360. Once stored, the host neighbor advertisement and neighbor advertisement messages are implemented to identify the location of the intermediate switch 240 within fabric 200.

In one embodiment, each advertisement message includes an identifier (e.g., 'chassis_id') that identifies the switch 240 from which the advertisement message originated. In such an embodiment, the same identifier string is advertised from switch 240 in both directions. In a further embodiment, an advertisement from an intermediate switch 240 is distinguishable from an advertisement from a directly attached virtualization host 230 because a neighbor advertisement message from an intermediate switch 240 includes a 'port_id' value as well as the 'chassis_id', while a host neighbor advertisement message from a directly attached hosts includes the 'chassis_id' and some identifiable information (e.g., host name, internet protocol (IP) address, media access control (MAC) address, etc.).

In one embodiment, fabric manager 140 includes topology management logic 330 to process neighbor change events received from neighbor discovery module 320 upon discovery of advertisement messages. Topology management logic 330 includes identification logic 332 to identify new intermediate switches 240 added to fabric 200 in response to a detected change event. In one embodiment, identification logic 332 determines whether there are associated neighbor advertisement message and host neighbor advertisement message entries stored in database 360 for a detected new switch 240. If so, identification logic 332 retrieves the messages and compares the chassis_id included in the messages to determine if there is a match. Accordingly, a switch 240 is successfully identified upon a determination of a match between the chassis_ids included in the neighbor advertisement message and host neighbor advertisement message. In one embodiment, the switch 240 is created in interface 310 upon being identified.

According to one embodiment, topology management logic 330 retrieves neighbor data and virtualization data from virtualization infrastructure 110 via interfaces 310 and 131 for modelling fabric 200 by model generator 334. Model generator 334 renders a visualization of the fabric 200 topology. In one embodiment, model generator 334 dynamically models an identified intermediate switch 240 within fabric 200 as physical connections change. In a further embodiment, model generator 334 reconstructs the model using the retrieved neighbor data and any previously-identified intermediate switches 240.

Provisioning logic 336 compares the generated visualization model with a current configuration of fabric 200, and automatically configures one or more virtual local area networks (VLANs) in response to detecting a difference between the visualization model and the current configuration network switch fabric. In one embodiment, provisioning logic 336 configures a VLAN for each of one or more virtual switches 232 within the virtualization hosts 230 that are coupled to the identified intermediary switch 240.

In this embodiment, the VLANs are configured such that VLANs found on virtual switches 232 uplinked to an intermediate switch 240 are applied to a VLAN Group. In a further embodiment, a port group having the VLAN configurations (e.g., VLAN Group) is named according to the intermediate switch 240, and the VLAN Group is applied to all of the fabric access ports where the intermediate switch 240 is connected. In such an embodiment, the VLAN Groups provide a reference to fabric ports that are on the other side of an intermediary switch 240.

Figure 4:
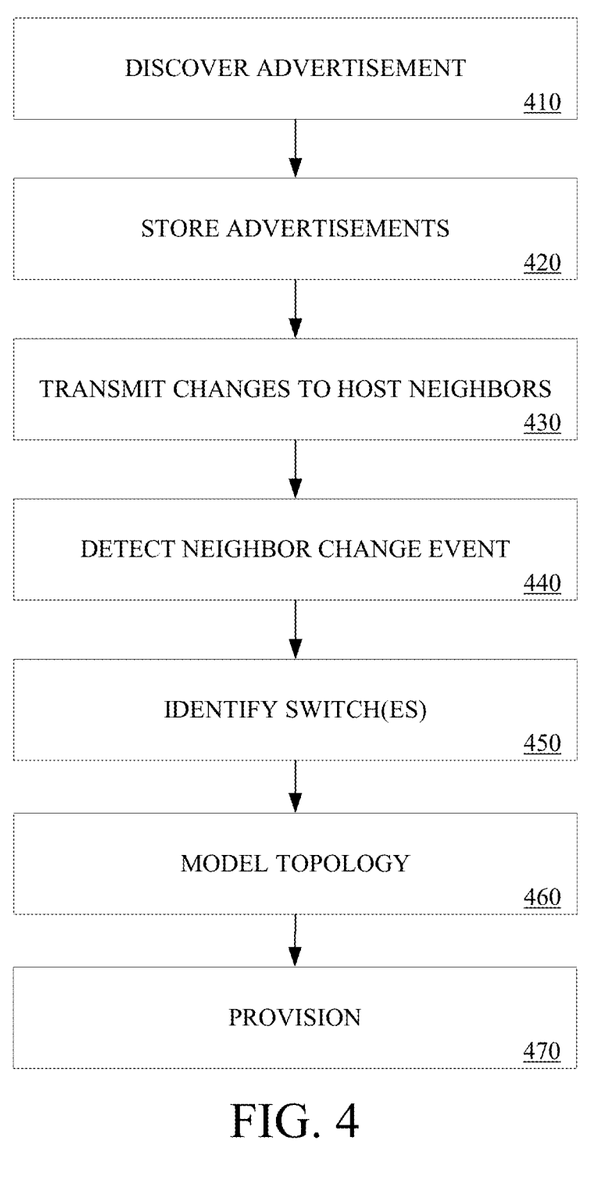
FIG. 4 is a flow diagram illustrating one embodiment of a method for discovering an intermediate switch.

FIG. 4 is a flow diagram illustrating one embodiment of a method for identifying an intermediate switch within fabric 200. At processing block 410, an advertisement message (neighbor advertisement message or host neighbor advertisement message) is discovered by neighbor discovery module 320. At processing block 420, the message is stored at database 360. At processing block 430, changes are transmitted by neighbor discovery module 320 to host neighbors as events. In one embodiment, the change event indicates that one or more intermediate switches 240 have been added to fabric 200.

At processing block 440, a neighbor change event is detected at topology management logic 330. At processing block 450, one or more intermediate switches 240 are identified in response to the detected change event. As discussed above, a switch 240 is identified by determining a match between the chassis_ids associated with neighbor advertisement and host neighbor advertisement message entries stored in database 360.

Once the switch 240 is identified, a visualization model of the fabric 200 topology is automatically rendered in response to identifying the switch 240, at processing block 460. In one embodiment, the visualization model includes a virtualization configuration (e.g., as configured adjacent to the Fabric Topology), in addition to the switch topology. Thus, the visualization model includes virtualization port group configurations (e.g., where VLAN is defined) that are relevant to a set of fabric ports located on the other side of the intermediate switch.

Figure 5:
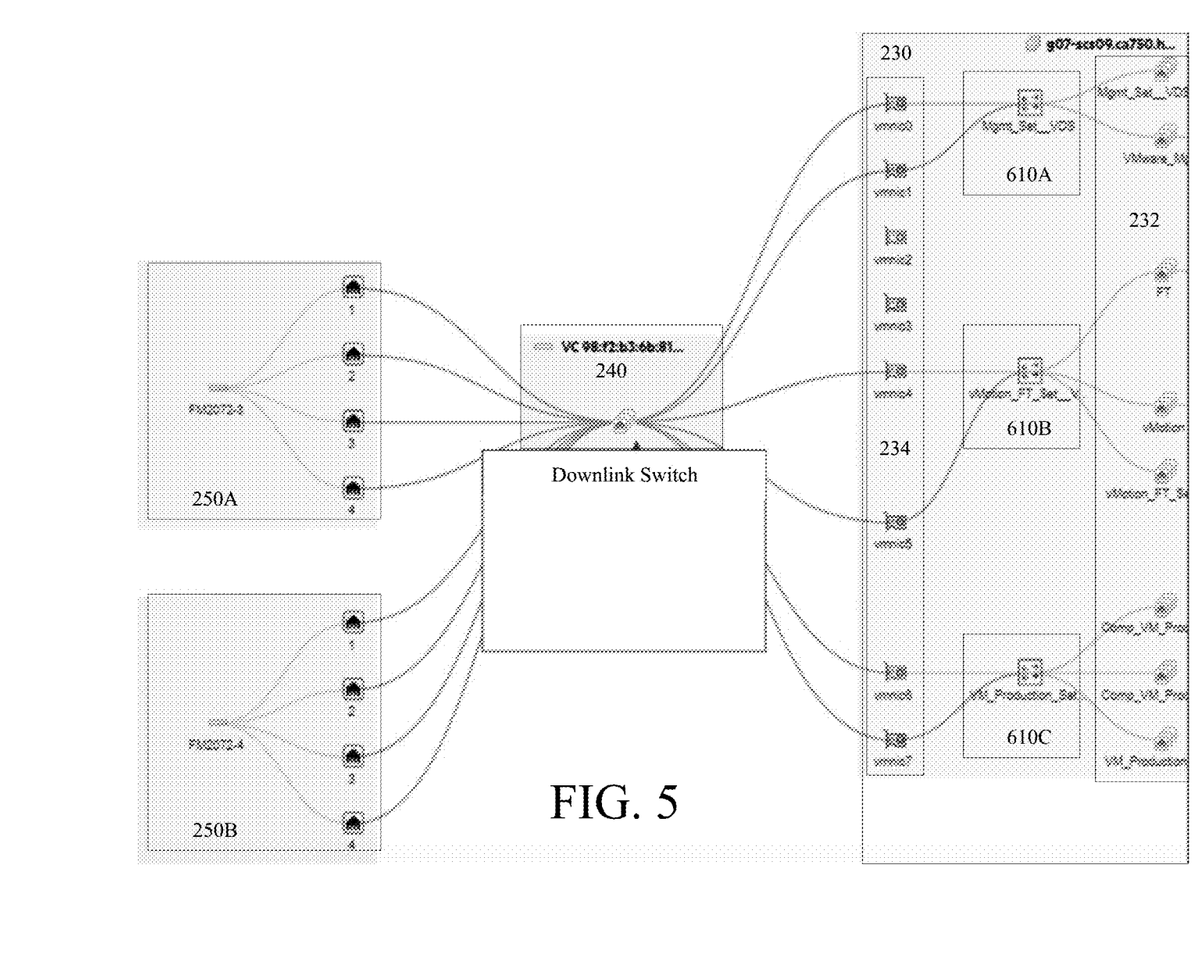
FIG. 5 illustrates one embodiment of a host view including an intermediate switch.

At processing block 470, VLANs are automatically configured for each of one or more virtual switches 232 within the virtualization hosts 230 coupled to the identified intermediary switch 240 in response to detecting a difference between the visualization model and the current configuration network switch fabric. FIG. 5 illustrates one embodiment of a host view of a fabric model including an intermediate switch 240 coupled between a virtualization host 230 and TOR switches 250A and 250B. As shown in FIG. 5, a virtualization host 230 includes VLAN groups 610 (e.g., 610A, 610B and 610C) between virtual switches 232 and VNICs that hold the VLAN configurations.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate identification of intermediate switches within a network switching fabric, comprising:
   a processor; and
   a non-transitory machine-readable medium storing instructions that, when executed, cause the processor to:
   discover a host neighbor advertisement message received at a virtualization infrastructure from an intermediary switch;
   receive a neighbor advertisement message from the intermediary switch via a top of rack (TOR) switch; and
   identify a location of the intermediary switch within the network switching fabric based on the host neighbor advertisement message and the neighbor advertisement message.

2. The system of claim 1, wherein the processor stores the neighbor advertisement message and the host neighbor advertisement message in a database.

3. The system of claim 2, wherein identifying the intermediary switch further comprises comparing the neighbor advertisement message and the host neighbor advertisement message to identify a location of the intermediary switch within the network switching fabric.

4. The system of claim 3, wherein the neighbor advertisement message and the host neighbor advertisement message each include an identifier to identify an intermediary switch from which a message originated.

5. The system of claim 4, wherein identifying the intermediary switch further comprises comparing an identifier included in the neighbor advertisement message to an identifier included in the host neighbor advertisement message.

6. The system of claim 1, wherein the instructions further cause the processor to generate a visualization model of a topology of the network switching fabric based on the location of the intermediary switch within the network switching fabric, wherein the visualization model includes the intermediary switch, the TOR switch and the virtualization infrastructure.

7. The system of claim 6, wherein the instructions further cause the processor to compare the visualization model to a current configuration of the network switching fabric.

8. The system of claim 7, wherein the instructions further cause the processor to automatically configure a virtual local area network (VLAN) for each virtual switch in the virtualization infrastructure coupled to the intermediary switch in response to detecting a difference between the visualization model and the current configuration network switch fabric.

9. A method to facilitate identification of intermediate switches within a network switching fabric, comprising:
discovering a host neighbor advertisement message received at a virtualization infrastructure from an intermediary switch;
receiving a neighbor advertisement message from the intermediary switch via a top of rack (TOR) switch; and
identifying a location of the intermediary switch within the network switching fabric based on the host neighbor advertisement message and the neighbor advertisement message.

10. The method of claim 9, further comprising storing the neighbor advertisement message and the host neighbor advertisement message in a database.

11. The method of claim 10, wherein identifying the intermediary switch further comprises comparing the neighbor advertisement message and the host neighbor advertisement message to identify a location of the intermediary switch within the network switching fabric.

12. The method of claim 11, wherein the neighbor advertisement message and the host neighbor advertisement message each include an identifier to identify an intermediary switch from which a message originated.

13. The method of claim 12, wherein identifying the intermediary switch further comprises comparing an identifier included in the neighbor advertisement message to an identifier included in the host neighbor advertisement message.

14. The method of claim 9, further comprising generating a visualization model of a topology of the network switching fabric based on the location of the intermediary switch within the network switching fabric, wherein the visualization model includes the intermediary switch, the TOR switch and the virtualization infrastructure.

15. The method of claim 14, further comprising comparing the visualization model to a current configuration of the network switching fabric.

16. The method of claim 15, further comprising automatically configuring a virtual local area network (VLAN) for each virtual switch in the virtualization infrastructure coupled to the intermediary switch in response to detecting a difference between the visualization model and the current configuration network switch fabric.

17. A non-transitory machine-readable medium storing instructions which, when executed by a processor, cause the processor to:
discover a host neighbor advertisement message received at a virtualization infrastructure from an intermediary switch;
receive a neighbor advertisement message from the intermediary switch via a top of rack (TOR) switch; and
identify a location of the intermediary switch within the network switching fabric based on the host neighbor advertisement message and the neighbor advertisement message.

18. The non-transitory machine-readable medium of claim 17, storing instructions which, when executed by the processor, further cause the processor to generate a visualization model of a topology of the network switching fabric based on the location of the intermediary switch within the network switching fabric, wherein the visualization model includes the intermediary switch, the TOR switch and the virtualization infrastructure.

19. The non-transitory machine-readable medium of claim 18, storing instructions which, when executed by the processor, further cause the processor to compare the visualization model to a current configuration of the network switching fabric.

20. The non-transitory machine-readable medium of claim 19, storing instructions which, when executed by the processor, further cause the processor to automatically configure a virtual local area network (VLAN) for each virtual switch in the virtualization infrastructure coupled to the intermediary switch in response to detecting a difference between the visualization model and the current configuration network switch fabric.

* * * * *